May 21, 1968 D. D. SKARKE 3,384,723

GROUNDING GUIDE FOR A PLUG-IN UNIT

Filed Sept. 6, 1966 2 Sheets-Sheet 1

INVENTOR
DONALD D. SKARKE
BY Roland I. Griffin
ATTORNEY

May 21, 1968 D. D. SKARKE 3,384,723

GROUNDING GUIDE FOR A PLUG-IN UNIT

Filed Sept. 6, 1966 2 Sheets-Sheet 2

INVENTOR
DONALD D. SKARKE

BY Roland D. Griffin
ATTORNEY

United States Patent Office 3,384,723

Patented May 21, 1968

3,384,723

GROUNDING GUIDE FOR A PLUG-IN UNIT

Donald D. Skarke, Colorado Springs, Colo., assignor to Hewlett-Packard Company, Palo Alto, Calif., a corporation of California Filed Sept. 6, 1966, Ser. No. 577,484
4 Claims. (Cl. 200—51.07)

ABSTRACT OF THE DISCLOSURE

A non-metallic guide is mounted on the main frame of an instrument to guide insertion of a plug-in unit into the instrument along a fixed insertion path. Electrically conductive grounding springs are mounted on the main frame along adjacent sides of the guide and in rows substantially parallel to the direction of insertion of the plug-in unit. An actuator mechanism is mounted on the main frame along each row of grounding springs. When the plug-in unit is near the end of the insertion path, this actuator mechanism forces the grounding springs to engage a lengthwise portion of the plug-in unit through openings in the adjacent of the guide.

This invention relates to a plug-in unit insertion guide for making a ground connection between the plug-in chassis and the main frame of an instrument into which the plug-in unit is inserted.

Many plug-in units are inserted into an instrument by sliding a portion of the plug-in chassis along a portion of the main frame of the instrument. If both of these portions are rigid, the position and quality of the ground connection provided between the plug-in chassis and the main frame by this sliding metal-to-metal contact are not consistent from unit to unit. The sliding metal-to-metal contact may also cause binding during insertion and excessive wear, and it is generally impractical for large plug-in units. Thus, several techniques have been devised for avoiding this sliding metal-to-metal contact. These techniques commonly employ a pair of contact terminals that intermesh as the plug-in unit is inserted, thus providing the required ground connection between the plug-in chassis and the main frame of the instrument. The ground connection provided by this pair of contact terminals is made only to a single point on the plug-in chassis and is therefore highly subject to impairment by dust or wear caused, for example, by small contact terminal misalignments. It is often necessary to obtain a more reliable ground connection that is distributed along the entire length of the plug-in chassis since a poor ground connection may degrade the operation of the instrument, especially at high frequencies.

Accordingly, it is the principal object of this invention to provide a plug-in unit insertion guide for eliminating the metal-to-metal contact over substantally all of the insertion path while facilitating smooth insertion of the plug-in unit and making a reliable and positive ground connection between the main frame of the instrument and the plug-in unit chassis.

This object is accomplished according to the illustrated embodiment of this invention by providing the main frame with a non-metallic guide for inserting the plug-in unit and with a plurality of metallic grounding springs that are actuated to contact the plug-in chassis only when the plug-in unit is nearly fully inserted. This small amount of sliding metal-to-metal contact provides a wiping action that helps to insure good contact between the grounding springs and the plug-in chassis.

Figure 1:
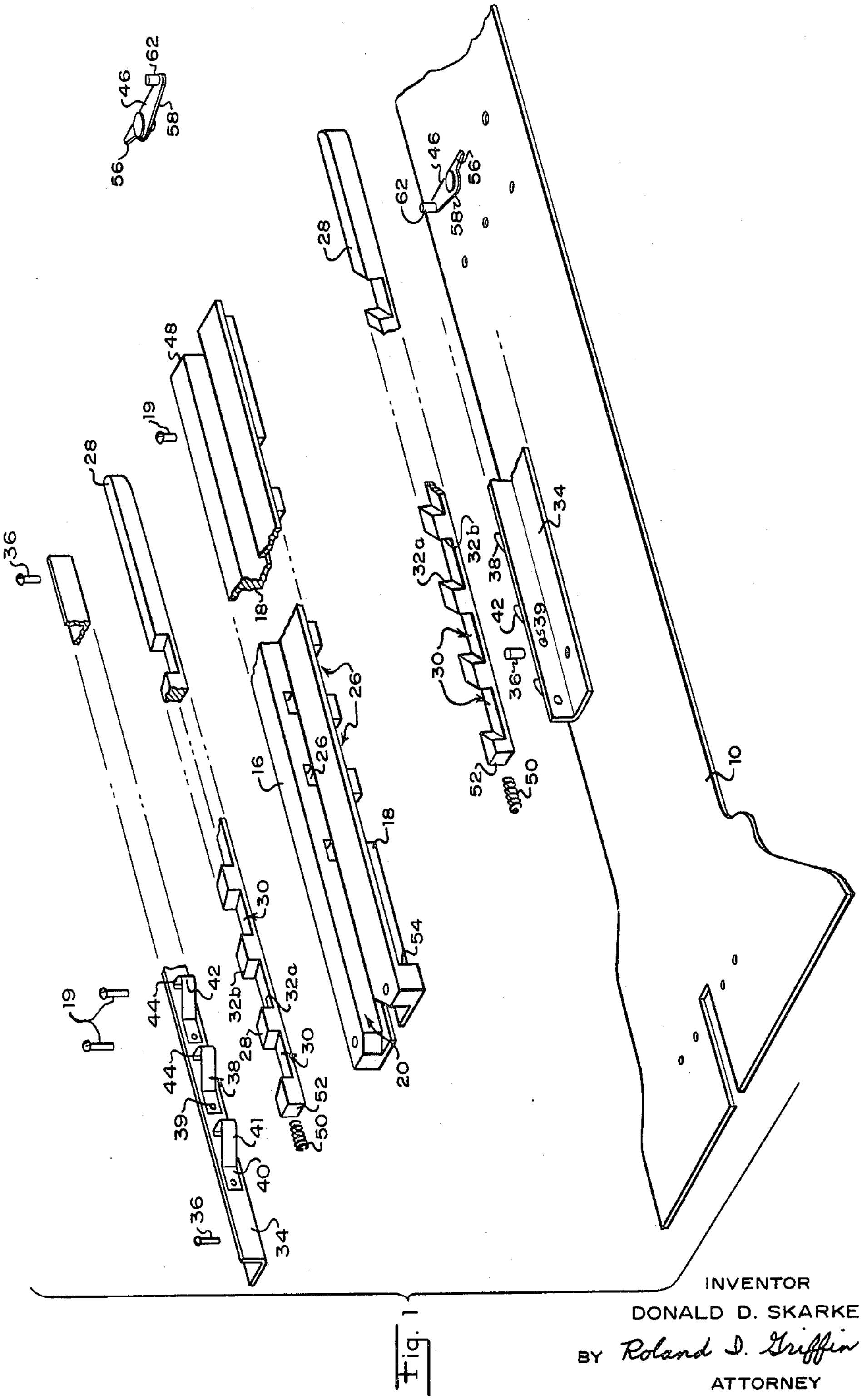
Figure 3:
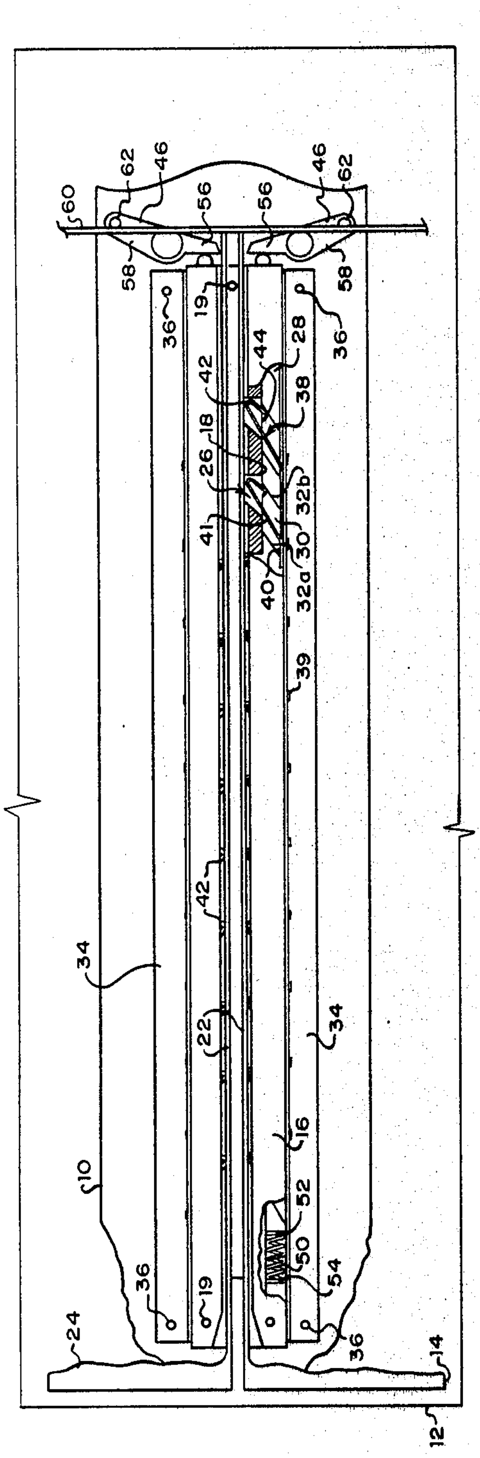
Figure 2:
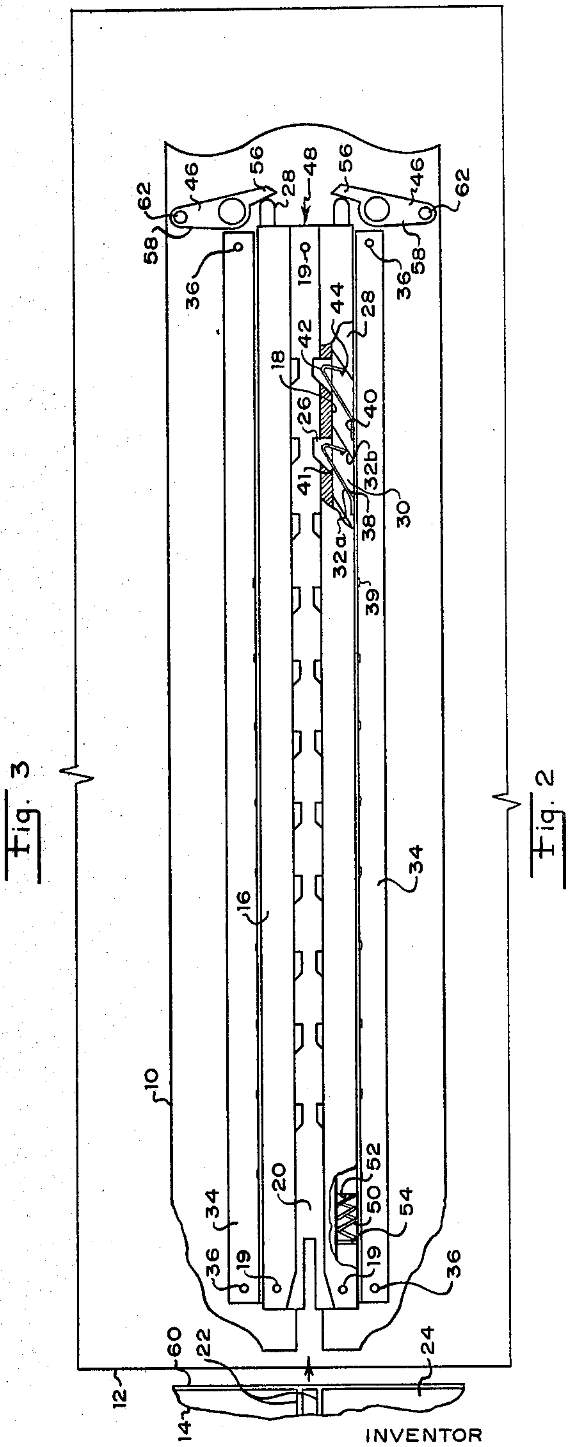

Other and incidental objects of this invention will be apparent from a reading of this specification and in inspection of the accompanying drawing in which:

FIGURE 1 is an exploded view of a plug-in unit grounding guide according to one embodiment of this invention; and FIGURES 2 and 3 are partially cut-away top views of the plug-in unit grounding guide of FIGURE 1 illustrating the condition of the grounding guide before and after insertion of the plug-in unit.

Referring now to the drawing, and particularly to FIGURE 1, there is shown a portion of the main frame 10 of an instrument 12 into which a plug-in unit 14 is to be inserted. A nonmetallic guide 16 having recessed side portions 18 is fixedly mounted, such as by rivets 19, on the main frame 10 for determining the plug-in unit insertion path. This guide 16 has a central channel 20 extending along the full length thereof for receiving a protruding portion 22 of the plug-in chassis 24 so as to guide insertion of the plug-in unit 14. The guide 16 also has a plurality of openings 26 spaced along each receessed side portion 18. These openings 26 communicate with the channel 20 along most of the length thereof. A pair of nonmetallic actuators 28 are slidably supported on the main frame 10, one adjacent to each recessed side portion 18 of the guide 16. Each of these actuators 28 has a plurality of transvers notches 30 that are each associated with one of the guide openings 26. The sides 32*a* and *b* of each notch 30 are flat, parallel, and angularly disposed with reference to the guide channel 20. A pair of L-shaped metallic supports 34 are fixedly mounted, such as by rivets 36, on the main frame 10, one adjacent to each actuator 28, for retaining the actuators in the recesses formed by the recessed side portions 18 of the guide 16 and by the main frame 10. A plurality of metallic grounding springs 38 are fixedly mounted, such as by rivets 39, along each metallic support 34 so that each grounding spring extends through an associated one of the notches 30 of the adjacent actuator 28 and into the guide opening 26 associated with that notch. Each grounding spring 38 comprises a mounting portion 40 which is fixedly attached to the associated support member 34, a front portion 41, a rounded contact portion 42 which protrudes into the associated guide opening 26, and a back portion 44 which is biased to ride along the associated notch side 32*b*. A pair of levers 46, each of which is associated with one of the actuators 28, are rotatably mounted on the main frame 10 near the back end 48 of the guide 16. Each actuator 28 is normally biased by a separate spring 50, which is supported on the main frame 10 between the front end 52 of that actuator and a front end portion 54 of the guide 16, to protrude from the back end 48 of guide 16 and abut upon one end 56 of the associated lever 46 thereby forcing the other end 58 of the associated lever to abut upon the upport member 34 associated with that actuator.

Before insertion of the plug-in unit 14 the actuators 28 are in the normal position. As shown in detail in FIGURE 2, when the actuators 28 are in this normal position the back portion 44 of each grounding spring 38 is biased by abutment of the front spring portion 41 upon the associated notch side 32*a* to ride near the bottom of the ramp provided by the associated notch side 32*b* so that the contact spring portion 42 is entirely retracted from the channel 20. The actuators 28 remain in this normal position while the plug-in unit 14 is being inserted into the instrument 12 until the plug-in unit is nearly at the end of the insertion path. At this point the rear panel 60 of the plug-in unit 14 abuts upon elevated lever portions 62 so that continued insertion of the plug-in unit 14 rotates the levers 46 thereby forcing the actuators 28 to compress springs 50 and move to an actuated position that corresponds to full insertion of the plug-in unit. As the actuators 28 are being moved to the actuated position each notch side 32*a* moves away from the associated front spring portion 41 and the back portion 44 of each grounding spring 38 rides up the ramp provided by the associated notch side 32*b* so that the rounded contact spring portion 42 is inserted into channel 20 and into smooth and positive engagement with the protruding portion 22 of the plug-in chassis 24. Thus, as shown in detail in FIGURE 3, when the actuators 28 are in the actuated position each grounding spring 38 is compressed between the protruding portion 22 of the plug-in chassis 24 and the associated notch side 32*b*. A positive ground connection between the grounding springs 38 and the plug-in chassis 24 is obtained even with normal wearing of the contact spring portions 42 since, when the actuators 28 are moved to the actuated position, the contact portions 42 are spring-biased against the protruding portion 22 of the plug-in chassis 24. As the plug-in unit 14 is being withdrawn springs 50 return the actuators 28 to the normal position so that the contact portions 42 of grounding springs 38 are again retracted from the guide channel 20 and, hence, from engagement with the plug-in chassis 24.

I claim:

1. Apparatus for making an electrical connection between the main frame of an instrument and the chassis of a plug-in unit to be inserted into said instrument, said apparatus comprising:

guide means mounted on one of the main frame of said instrument and the chassis of said plug-in unit to guide insertion of said plug-in unit into said instrument along a desired insertion path, said guide means having openings therein;

electrically conductive contact means supported on said one of said main frame and said chassis adjacent to said insertion path for engaging a portion of the other one of said main frame and said chassis through said openings, said contact means being normally retracted from said insertion path; and actuator means movably supported on said one of said main frame and said chassis adjacent to said contact means for actuating said contact means into said insertion path to engage said other one of said main frame and said chassis only when said plug-in unit is near the end of said insertion path.

2. Apparatus as in claim 1 wherein said electrically conductive contact means includes a plurality of electrically conductive contact elements mounted in a row substantially parallel to the direction of movement of said plug-in unit along said insertion path.

3. Apparatus as in claim 2 wherein:

said guide means includes a nonmetallic guide member having a channel along the length thereof for receiving a lengthwise portion of said other one of said main frame and said chassis to guide insertion of said plug-in unit into said instrument;

said openings in the guide means comprise a plurality of openings positioned in said guide member along at least one side of said channel; and each of said conductive contact elements has a first portion associated with one of said openings and is actuated by said actuator means for inserting said first portion through the associated opening and into said channel to engage said lengthwise portion of said other one of said main frame and said chassis.

4. Apparatus as in claim 3 wherein said actuator means comprises:

an actuator member movably supported adjacent to said guide member and having a plurality of transverse notches, each of said notches receiving an associated one of said contact elements and having one side angularly disposed relative to said channel to form a ramp on which a second portion of the associated contact element rides;

a spring element fixedly supported at one end of said actuator member for normally biasing said actuator member to a first position at which said second portion of each of said contact elements rides near the bottom of said ramp of the associated notch and away from said channel, whereby said first portion of each of said contact elements is retracted from said channel; and a lever member rotatably mounted on said one of said main frame and said chassis near the other end of said actuator member, said lever member being engageable by a portion of said other one of said main frame and said chassis for forcing said actuator member only when said plug-in unit is near the end of said insertion path to compress said spring element and move to a second position at which said second portion of each of said contact elements rides higher up on said ramp of the associated notch and closer to said channel, whereby said first portion of each of said contact elements is inserted through the associated opening into said channel to engage said lengthwise portion of said other one of said main frame and said chassis.

References Cited

UNITED STATES PATENTS

| | | | |
|---|---|---|---|
| 2,731,609 | 1/1956 | Sobel. | |
| 3,130,351 | 4/1964 | Giel. | |
| 3,344,243 | 9/1967 | De Vries | 200—51 X |

ROBERT K. SCHAFFER, *Primary Examiner.*

D. SMITH, JR., *Assistant Examiner.*